United States Patent
Hinn et al.

(10) Patent No.: US 12,299,148 B2
(45) Date of Patent: *May 13, 2025

(54) PRIVATE SESSION FOR MOBILE APPLICATION

(71) Applicant: OSOM Products, Inc., Cupertino, CA (US)

(72) Inventors: Jonas Hinn, Evanston, IL (US); Gary Anderson, San Mateo, CA (US)

(73) Assignee: Solana Mobile Inc., San Francisco, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/313,246

(22) Filed: May 5, 2023

(65) Prior Publication Data

US 2024/0104230 A1   Mar. 28, 2024

Related U.S. Application Data

(63) Continuation of application No. 17/935,056, filed on Sep. 23, 2022, now Pat. No. 11,681,816.

(51) Int. Cl.
*G06F 21/62* (2013.01)
*G06F 21/60* (2013.01)

(52) U.S. Cl.
CPC ............ *G06F 21/62* (2013.01); *G06F 21/604* (2013.01); *G06F 2221/2149* (2013.01)

(58) Field of Classification Search
CPC ........ G06F 21/62; G06F 21/604; G06F 21/53; G06F 2221/2149
See application file for complete search history.

(56) References Cited

U.S. PATENT DOCUMENTS

| | | |
|---|---|---|
| 9,591,481 B1 | 3/2017 | Fisher et al. |
| 2005/0223225 A1 | 10/2005 | Campbell et al. |
| 2007/0040780 A1* | 2/2007 | Gass ................ G02F 1/134363 |
| | | 345/87 |
| 2008/0183819 A1 | 7/2008 | Gould et al. |
| 2009/0165145 A1 | 6/2009 | Haapsaari et al. |
| 2010/0235881 A1 | 9/2010 | Liu et al. |

(Continued)

OTHER PUBLICATIONS

Herbster, Raul, et al., "Privacy Capsules: Preventing Information Leaks by Mobile Apps", MobiSys' 16, Jun. 25-30, 2016, Singapore, Jun. 2016, pp. 399-411.

(Continued)

*Primary Examiner* — Robert B Leung
(74) *Attorney, Agent, or Firm* — PERKINS COIE LLP; Andrew Pettit (57) ABSTRACT

A mobile device can receive input to execute a target application in a private session. The target application is a native application for a mobile platform of the mobile device. The private session is a native function of the mobile device configured to isolate data of the target application. In response to the input, the mobile device can configure a local resource of the mobile device to support the target application in the private session, instantiate a procedure that utilizes the local resource to isolate the data of the target application while in the private session, and execute the target application in the private session on the mobile device. The operation of the private session is transparent and undetectable to the target application.

17 Claims, 4 Drawing Sheets

(56) References Cited

U.S. PATENT DOCUMENTS

| | | |
|---|---|---|
| 2012/0157049 A1 | 6/2012 | Eliovits et al. |
| 2012/0157165 A1 | 6/2012 | Kim et al. |
| 2012/0246731 A1 | 9/2012 | Blaisdell et al. |
| 2013/0167045 A1* | 6/2013 | Xu .................. H04L 67/535 |
| | | 711/E12.017 |
| 2014/0273880 A1 | 9/2014 | Sima et al. |
| 2015/0281383 A1* | 10/2015 | Bilinski ............... H04L 67/53 |
| | | 709/202 |
| 2016/0062958 A1* | 3/2016 | Shirakawa ........... G06F 3/0483 |
| | | 715/234 |
| 2016/0381026 A1 | 12/2016 | Silva Pinto et al. |
| 2017/0221055 A1 | 8/2017 | Carlsson et al. |
| 2017/0339248 A1* | 11/2017 | Karalis ............. H04L 63/1433 |
| 2018/0150653 A1* | 5/2018 | Baer .................. H04W 4/02 |
| 2018/0232534 A1 | 8/2018 | Dotan-Cohen et al. |
| 2019/0213336 A1* | 7/2019 | Kundu ................ G06F 16/683 |
| 2019/0340493 A1* | 11/2019 | Coenen ................ G06N 3/08 |
| 2020/0289925 A1 | 9/2020 | Norton |
| 2022/0075866 A1 | 3/2022 | Gagne-Keats et al. |
| 2022/0277091 A1 | 9/2022 | Moharana et al. |

OTHER PUBLICATIONS

Madnick, Stuart E, et al., "Application and Analysis of the Virtual Machine Approach to Information System Security and Isolation", Proceedings of the workshop on virtual computer systems. (Year: 1973), Mar. 26, 1973, pp. 210-224.

Malkapuram, Sumana , "Application Session Management", Auth0's blog. Jan. 25, 2022 (Jan. 25, 2022) Retrieved on Dec. 27, 2022 (Dec. 27, 2022) from <https://authO.com/blog/application-session-management-best-practices/> entire document, Jan. 25, 2022, 15 pp.

Zhou, Yajin , et al., "Taming information-stealing smartphone applications (on android)", International conference on Trust and trustworthy computing. Jun. 22, 2011 (pp. 93-107). Springer, Berlin, Heidelberg., 2011, pp. 93-107.

United States Patent and Trademark Office (USPTO), International Search Report and Written Opinion, PCT/US2022/076977, Feb. 1, 2023, counterpart to U.S. Appl. No. 17/935,056.

* cited by examiner

PRIVATE SESSION FOR MOBILE APPLICATION

CROSS-REFERENCE TO RELATED APPLICATIONS

This application is a continuation of the U.S. patent application Ser. No. 17/935,056 entitled "PRIVATE SESSION FOR MOBILE APPLICATION" filed Sep. 23, 2022, which is incorporated by reference herein in its entirety.

BACKGROUND

A mobile phone is a handheld mobile device that can make and receive voice calls over a radio frequency link while the user is moving within a service area. The radio frequency link establishes a connection to a network operator, which provides access to services. A smartphone is a portable computer device that combines mobile phone and computing functions into one unit. They are distinguished from conventional mobile phones by their more sophisticated hardware capabilities and extensive mobile operating systems, which facilitate wider software, internet (e.g., web browsing over mobile broadband), and multimedia functionality (e.g., music, video, cameras, and gaming), alongside core phone functions such as voice calls and text messaging. Smartphones typically contain a number of metal-oxide-semiconductor (MOS) integrated circuit (IC) chips, include various sensors (e.g., magnetometer, proximity sensors, barometer, gyroscope, accelerometer and more) that can be leveraged by pre-included and third-party software applications, and support wireless communication protocols (e.g., Bluetooth, Wi-Fi, or satellite navigation).

A mobile application ("app") is a computer program or software application designed to run on a mobile device such as a smartphone, tablet, or smart watch. Mobile apps often stand in contrast to desktop applications which are designed to run on desktop computers, and web applications which run in mobile web browsers rather than directly on the mobile device. Apps were originally intended for productivity assistance such as email, calendar, and contact databases. Public demand for apps has caused rapid expansion into other areas such as mobile games, factory automation, GPS and location-based services, order-tracking, and ticket purchases, such that there are now millions of apps available. Apps are generally downloaded from app stores, which are a type of digital distribution platform. An app store is any digital storefront intended to allow search and review of software titles or other media offered for free or sale electronically. The application storefront itself can provide a secure, uniform experience that automates the electronic purchase, decryption and installation of software applications or other digital media.

BRIEF DESCRIPTION OF THE DRAWINGS

Detailed descriptions of implementations of the present technology will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology is operational on a mobile device to run applications ("apps") in a private mode. A user of the mobile device can select to put the app in the private mode, which is controlled by the original equipment manufacturer (OEM) to configure hardware, software, and/or data to run the app in a protected space. In one example, the data for the app is separated from everything else on the mobile device. When done using the app, the associated user data and any related cached data is deleted. The OEM understands how to configure local resources with data analysis and heuristics based on app-store metadata to make decisions about how to handle an app. The technology has safeguards including preventing apps from sharing data or can pull another app into the common private mode, block screenshots, and deny accessibility features (e.g., key logging). Another feature of the disclosed technology includes a custom visual indication of when the app is in private mode. The indication allows a user to define how a private session is visually represented so that an app cannot fake being in a private session. In other words, the user that defined the custom visual indication can manually detect whether an app is in an authentic private session or a fake private session.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The disclosed technology addresses the privacy concerns of users of mobile apps. For example, apps that are available at an app store for download can leave a mobile device vulnerable to unwanted activity. In particular, the data that is input by a user could be unknowingly communicated over a network to a remote server that monetizes the user's data, tracks the user's activity, or for malicious purposes such as to steal the user's identity. In another example, the data generated by the mobile device, generated by the app, or generated by another app that is running concurrently, can be captured and routed to the third-party server. As such, the user's privacy is compromised because their data is being routed to a third-party server that performs unwanted activity. In another example, an app is secure but is intentionally designed to capture data input by the user or capture data generated by the app, another app concurrently running on the mobile device or another app that is running concurrently on the same mobile device. In yet another example, the app is secure but the user may nevertheless wish to keep their data private by preventing the data from being stored locally or communicated to another device or server.

Existing techniques for maintaining app data private include features that are built into the app itself to control whether the app can capture and/or share data. For example, an app can include controls to limit or disable communicating data over a network or prevent data from being cached at the device. However, an app can have fake privacy controls. Even if an operating system (OS) includes privacy controls, the OS can be similarly compromised or even fail to secure an app, especially a more recently released app with new features.

Another example of techniques for keeping data private includes privacy browsing, which is a privacy feature in some web browsers. When operating in such a mode, a browser creates a temporary session that is isolated from the browser's main session and user data. Browsing history is not saved, and local data associated with the session, such as cookies, web cache, are cleared when the session is closed. These modes are designed primarily to prevent data and history associated with a browsing session from persisting on the device or being discovered by another user of the same device.

Private browsing modes do not necessarily protect users from being tracked by other websites or their Internet service provider (ISP). Furthermore, there is a possibility that identifiable traces of activity could be leaked from private browsing sessions by means of the OS, security flaws in the browser, or via malicious browser extensions, and it has been found that certain HTML5 APIs can be used to detect the presence of private browsing modes due to differences in behavior.

Examples of uses of private browsing modes include hiding undesirable content from the browsing history, performing web searches that are not algorithmically influenced by prior browsing habits or the user's recorded interests, providing a "clean" temporary session for a guest user (such as when using a public computer), and using websites with multiple accounts simultaneously. Private browsing has also been used to circumvent metered paywalls on some websites.

App Privacy Session

The disclosed technology creates a privacy session for an app. The privacy session is app-specific and controlled independent of the app but is not an app-agnostic virtual container. As such, the privacy session is designed to host a specific app and is not detectable by that app. In operation, a user can select to run the app in a private mode (as opposed to a non-private mode). The private mode is controlled by the OEM to configure local hardware, software, and/or data to execute the app in a private session. In one example, a model is built for a specific app (e.g., has an app-specific profile) and the model is used to configure the mobile device for hosting that app. The model can be based on data obtained about the app from an app store where the app was downloaded. The data can indicate characteristics of the app (e.g., app type). The model can also be built based on data of one or more mobile devices that execute apps that have similar characteristics.

Figure 1:
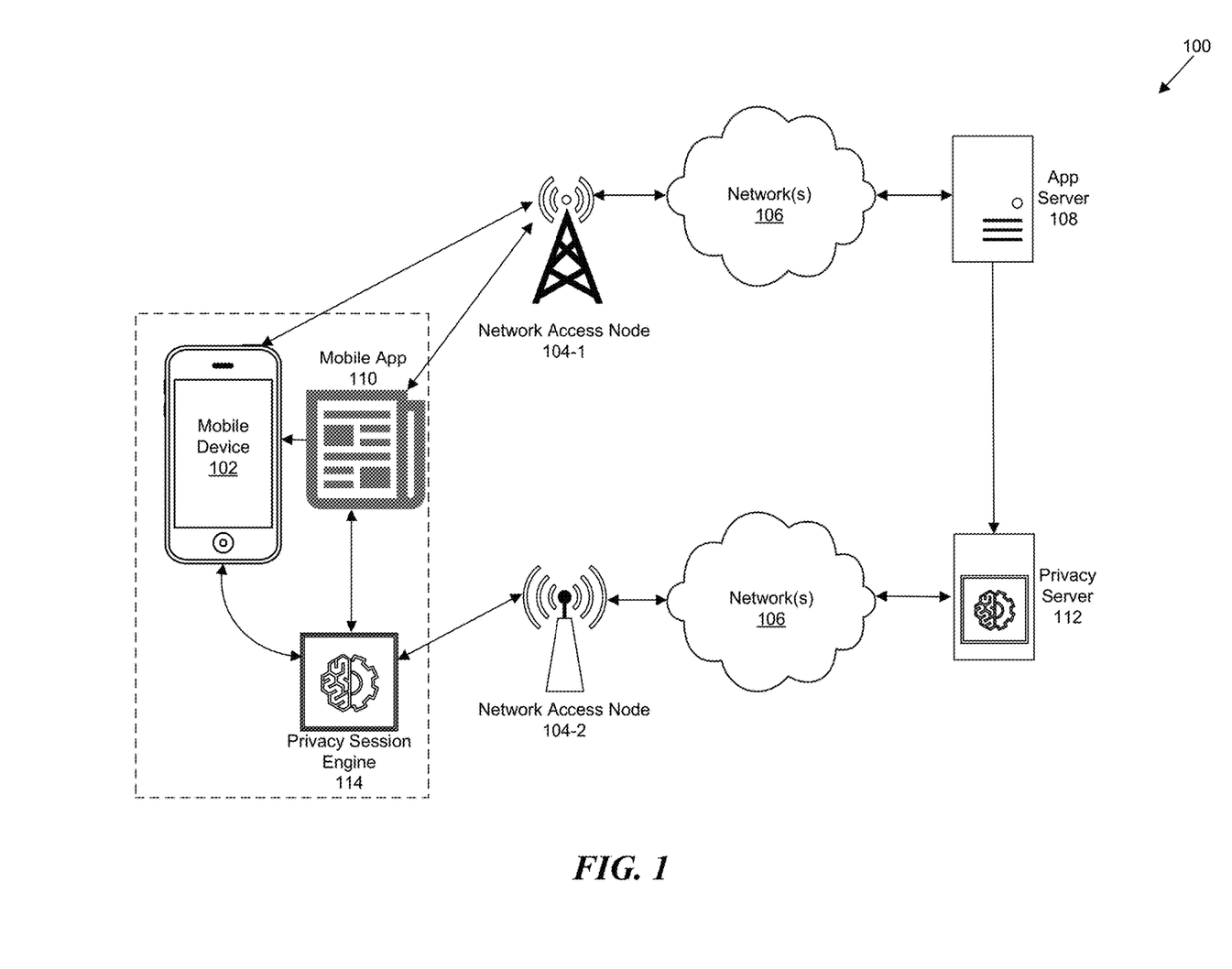
FIG. 1 illustrates a system for configuring a mobile device to execute a mobile application ("app") in a private mode.

FIG. 1 illustrates a system for configuring a mobile device to execute a mobile app in a private mode. As shown, the system 100 includes a mobile device 102 that can communicate via a network access node 104-1 over one or more networks 106 to an app server 108. The system 100 also illustrates an app 110 that is downloaded to the mobile device 102 from the app server 108. A privacy server 112 can obtain data about the app 110 from the app server 108. The data about the app 110 can be used to generate an app-specific model for a privacy session. The model is communicated over the network(s) 106 via a network access node 104-2 to a privacy engine 114 of the mobile device 102. The privacy engine 114 can implement the model and/or create its own app-specific model or update the downloaded model. The model stored at the mobile device 102 can configure the underlying hardware, software, and data to run the app 110 in a private session. For example, the privacy engine 114 can control whether app data is stored locally and/or is communicated to a third-party data aggregator.

The mobile device 102 can be any type of endpoint device that can communicate over a wired or a wireless network to a network node (e.g., app server 108, privacy server 112) and/or with another computing device over networks (e.g., computer network, telecommunications network). Examples of the mobile device 102 include a smartphone, a tablet computer, a wearable device, an Internet-of-Things (IoT) device, a laptop, or any other electronic device that can access the network(s) 106 to download the mobile app 110. A non-mobile device (e.g., desktop computer) can also implement the disclosed technology to selectively run an app in a privacy mode.

The mobile device 102, privacy server 112, and other components of the system 100 can store and transmit (e.g., internally and/or to other electronic devices over a network) code (composed of software instructions) and data using machine-readable media, such as non-transitory machine-readable media (e.g., machine-readable storage media such as magnetic disks, optical disks, read-only memory (ROM), flash memory devices, and phase change memory) and transitory machine-readable transmission media (e.g., electrical, optical, acoustical, or other forms of propagated signals, such as carrier waves or infrared signals).

The network access nodes 104-1 and 104-2 (collectively referred to as "network access nodes 204") can include any type of network node that can communicate with an electronic device over a communications network. The network access nodes 104 can include a network device or apparatus. Examples of network access nodes include a base station (e.g., network access node 104-1), an access point (e.g., network access node 104-2), or any other type of network node such as a network controller, radio network controller (RNC), base station controller (BSC), a relay, transmission points, or any other device that can connect an endpoint device to a network. The system 100 depicts different types of network access nodes 104 to illustrate that the mobile device 102 can access different types of networks through different types of network access nodes. For example, a base station (e.g., the network access node 104-1) can provide access to a cellular telecommunications system of the network(s) 106. An access point (e.g., the network access node 104-2) includes a transceiver that provides access to a computer system of the network(s) 106.

The network(s) 106 can include any combination of private, public, wired, or wireless systems such as a cellular network, a computer network, the Internet, and the like. Any data communicated over the network(s) 106 can be encrypted or unencrypted at various locations or along different portions of the network(s) 106. Examples of wireless systems include Wideband Code Division Multiple Access (WCDMA), High Speed Packet Access (HSPA), Wi-Fi, Wireless Local Area Network (WLAN), and Global System for Mobile Communications (GSM), GSM Enhanced Data Rates for Global Evolution (EDGE) Radio Access Network (GERAN), 4G, 5G, 6G wireless wide area networks (WWAN), and other systems that can also benefit from this disclosure.

The mobile app 110 includes a software program that is downloadable from the app server 108. An example of the mobile app 110 includes a native app, which is specifically designed for a particular mobile platform (e.g., a mobile operating system (OS)) such as iOS or Android. Therefore, a native app intended for an Apple device does not run in Android devices. As a result, third-party native apps are developed for multiple platforms. A native app can include user interface modules and are designed to optimize performance, consistency, and good user experience. Users can also benefit from wider access to application programming interfaces (APIs) to make concurrent use of multiple apps at the mobile device 102. Further, a user of the mobile device 102 can switch to focus over from one native app to another, effortlessly.

A web app is written in HTML5 or CSS and runs on a browser. Internet access is typically required for proper behavior or being able to use all features compared to offline usage. Most, if not all, user data is stored remotely in the cloud. The performance of web-based apps is similar to a web application running in a browser, which can be noticeably slower than the equivalent native app. The concept of the hybrid app is a mix of native and web-based apps. Hybrid apps are built using web technologies such as JavaScript, CSS, and HTML5 and function like web apps in a native container. Hybrid apps are made to support web and native technologies across multiple platforms by using of single codebase which works in multiple mobile OSs.

The app server 108 stores one or more apps that are available for download to devices such as the mobile device 102. Specifically, apps that are not pre-installed on the mobile device 102 are usually available through distribution platforms such as app stores, which can reside on or be administered by the app server 108. An app store can be operated by the owner of a device's mobile OS, such as the App Store (iOS) or Google Play Store, by device manufacturers, such as the Galaxy Store and Huawei AppGallery, or by third parties, such as the Amazon Appstore and F-Droid. Usually, apps are downloaded from the platform to a target device, but they can be downloaded to laptops or desktop computers, in some examples. Apps can also be installed manually, for example by running an Android application package on Android devices.

The privacy server 112 can be supported, controlled, and/or administer by the OEM of the mobile device 102. The privacy server 112 can obtain app-related data from the app server 108 or from one or more mobile devices including the mobile device 102. Although only one app server is shown in FIG. 1, the system 100 can include multiple sources of app-related data. Examples of the app-related data aggregated by the privacy server 112 include metadata about apps and/or data that indicates characteristics of apps. The metadata can indicate a source/creator of an app, the date that an app was posted or made available for download, a version of an app, popularity rank of an app (e.g., downloads relative to other apps available on an app store), a category of the app, etc. The characteristics of the data can be determined or derived from an analysis of the metadata, utilization statistics, or other app-related data.

In one example, an app category is obtained from the app server 108, the app creator, or based on related apps. Examples of categories include navigation, travel, health, finance, entertainment, utilities, home security, games, retail, or work. The privacy server 112 can determine characteristics including types of data handled by the app. For example, a finance or health app may handle sensitive or private data. A social media app, search app, or dating app may handle personal data or data that identifies users, and a media app (e.g., video or audio streaming) handles data that indicates user preferences. The type of data handled by apps can be used to configure how the mobile device 102 blocks sources of data or tags data generated by a particular app, which can be readily identified and later removed as a result. The app-related data can also be used to identify or predict vulnerabilities of apps based on historical data about sources/creators, and/or known bugs associated with versions or posted dates.

The characteristics of an app can include utilization statistics. The utilization statistics can include use of the app at the mobile device 102 and/or by other mobile devices. A characteristic about an app can be determined from an analysis of the behavior of the app, how the app is used, and/or other apps that are accessed by a target app. For example, a characteristic can include whether an app is used to access other apps or access certain hardware on the mobile device 102. In one example, a social media app is used to regularly access a camera of a mobile device 102 to capture images/video. The privacy server 112 can create a model for that target app to cause the mobile device 102 to create a private memory space for temporarily storing the images/video captured with the target app while in a private mode. The private memory space is cleared periodically or when the user logs off the target app. In another example, data that is generated by the target app and/or stored at the mobile device 102 during a private session is automatically tagged for deletion. In another example, the activity of a target app can include a type or frequency of communications between the mobile device 102 and a remote server over a communications network. The privacy server 112 can create a model for the target app that blocks or obfuscates the communications between the mobile device 102 and the remote server.

The privacy server 112 can include a data mining function to retrieve and analyze app-related data. As such, the app-related data can be communicated in one or more data streams from source servers (e.g., the app server 108) to the privacy server 112. In one example, the app-related data is periodically retrieved (e.g., every 5 minutes, twice daily) by the privacy server 112 from the app server 108 and/or mobile devices (e.g., mobile device 102) to the privacy server 112. The data mining function is configured to extract and discover patterns in the app-related data, which is used to configure the mobile device 102 to support a privacy session for a target app. The data mining function is configured to extract app-related data and transform the extracted data into information that is useful to support private sessions for target apps. The data mining function component can also perform data aggregation to compile app-related data extracted from the app server 108 to prepare models for target apps.

The privacy server 112 can incorporate heuristics or machine intelligence technology to create models for target apps. A heuristic can include a function that ranks alternatives in search algorithms at each branching step based on available information to decide which branch to follow. For example, it may approximate an exact solution for a privacy session. A heuristic function can predict characteristics of target apps to create a privacy model. The privacy server 112 can run machine learning (ML) algorithms, which construct models that automatically improve over time with additional training data obtained from one or more sources. For example, ML algorithms can build a model based on sample data to enable forecasting or making predictions about app behavior based on use of similar apps in the same app category or that handle similar types of app data.

A "m ode I" or "app-specific model" are used interchangeably herein and can refer to a construct that is trained using training data to make predictions or provide probabilities for new data items, whether or not the new data items were included in the training data. For example, training data for supervised learning can include data items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, a model for an app-specific private mode can include a neural network with multiple input nodes that receive app-related data from different sources. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer") one or more nodes can produce a value classifying the input that, once the model is trained, can be used to create a model for an app-specific model. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A model can be trained with supervised learning, where the training data includes app-related data obtained from an app store as input and a desired output that, for example, removes all data associated with a target app during a private session. A representation of a privacy model for an app can be provided to the model. Output from the model can be compared to the desired output for the target app and, based on the comparison, the model can be modified, such as by changing weights between nodes of the neural network or parameters of the functions used at each node in the neural network (e.g., applying a loss function). After applying a model for a target app and producing outputs, the model can be trained to evaluate similar target apps.

The privacy server 112 includes an analytics component that can generate and/or administer a network portal. An example includes an online web-based portal that can display visualizations or other user-friendly features that enable end users to investigate performance of models and learn procedures for improving app-specific privacy sessions on the mobile device 102. The analytics component enables continuous iterative exploration and investigation of past performance to predict future performance in different scenarios. The analytics component can utilize statistical methods to form a data-driven understanding of a target app and associated model, and to develop new insights into the performance of models for similar apps. The analytics component makes extensive use of tools and analytical modeling and numerical analysis, including explanatory and predictive modeling, as well as fact-based management to drive decision-making.

The privacy engine 114 of the mobile device 102 can implement a model for the mobile app 110 that was received by the mobile device 102 from the privacy server 112. In particular, the privacy server 112 can generate a model for a target app based on app-related data of the target app or other similar apps. For example, a model for a banking app can be built and trained based on app data of financial apps. In another example, the privacy engine 114 performs at least some of the functions of the privacy server 112 described above to generate a model for the mobile app 110 and additionally implements the model for the mobile app 110. In another example, the privacy engine 114 and the privacy server 108 are components that collectively generate a model for the mobile app 110 and the privacy engine 114 implements the model for the mobile app 110.

The privacy engine 114 is exclusively an OEM feature of the mobile device 102 to configure the hardware, software, and data required for a private mode of the mobile app 110. The OEM understands how to configure local resources with data analysis and heuristics based on the app-related data to make decisions about how to handle an app in a private session. For example, a private session for the mobile app 110 can separate data of the mobile app 110 from other apps on the mobile device 102. When done using the mobile app 110, the associated app data (e.g., user-specific app data) and any related cached data can be deleted. A private session has safeguards including preventing a target app from sharing data with another app or device. In another example, a private session for a target app can pull another app into the common private session, which blocks screenshots, and denies accessibility features (e.g., key logging). The mobile device 102 can thus create a temporary session that is isolated from a non-private session and user data. A history of the app is not saved while in a private session, and local data associated with the private session are cleared when the private session is closed, for example. The private mode is thus designed to prevent data associated with a particular private session from persisting on the mobile device 102 or being discovered by another user of the mobile device 102.

The disclosed technology includes a user-defined indication that a mobile app is in a private mode. In particular, an effective privacy technology requires that the user trust or verify that privacy controls are operating properly. As indicated earlier, existing technology such as private browsing sessions of web browsers are controlled by the browser. As such, a user needs to trust that the browser will enforce privacy controls while in a privacy mode. Such technology includes indications that the browser is operating in a private browser session. However, the indications do not provide an independent verification that the browser is operating in a private mode. For example, the browser can be corrupted or intentionally designed to deceive a user that the browser is operating in a private mode when it is actually operating in a non-private mode. Any app-specific privacy setting features or privacy containers are similarly flawed because the app itself controls the privacy controls.

Accordingly, an app can display a visual indication of a private mode even when operating in a non-private mode. As such, the app deceives the user and circumvents privacy controls. To address this issue, the disclosed solution includes a user-defined visual indication of the private session for a specific app. As such, a user can verify that an app is operating in a private session based on inspection of a custom visual indication. For example, the privacy engine 114, as controlled by the OEM, can allow a user of the mobile device 102 to define how a private session is visually represented so that a target app cannot fake being in a private session.

Figure 2A:
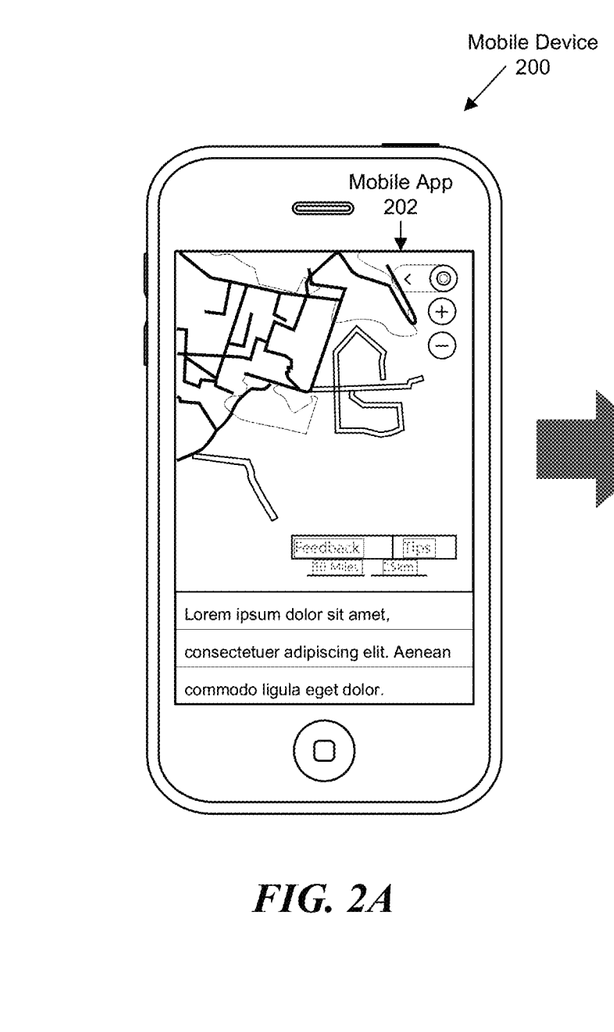
FIG. 2A illustrates an example of an interface displayed on a mobile device executing a mobile app in a non-private session.
Figure 2B:
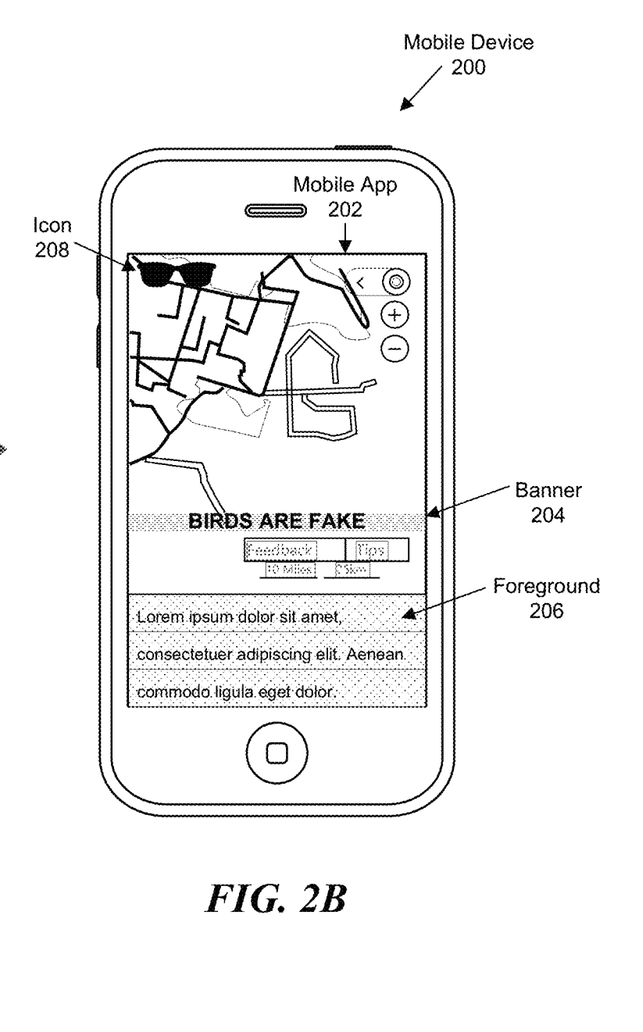
FIG. 2B illustrates an example of an interface displayed on the mobile device executing a mobile app in a private session.

FIG. 2A illustrates an example of an interface displayed on a mobile device 200 running a mobile app in a non-private session. As shown in the illustrated example, the mobile app 202 is a navigation app that includes a map and text displayed below the map. FIG. 2B illustrates an example of the mobile device 200 of FIG. 2A including the mobile app 202 that has been altered with user-defined indications of a private mode. For example, in response to a new app being downloaded to the mobile device 200, the user can be prompted to select one or more visual indications of a private session for the downloaded app. The ability to customize the visual indications can vary in scope and type. A visual indication can include one or more additions and/or changes to a target app. The indication can include a time-based dimension and/or a visual dimension. For example, the user can select a combination of additional features that are added to the mobile app 202 while being hosted in a private session.

FIG. 2B illustrates an example of a user interface displayed on the mobile device 200 running the mobile app in a private session. FIG. 2B shows a visual indication including a combination of four features indicating that the mobile app 202 is operating in a private mode. The features include a banner 204 that is selected by a user and presents the custom text "BIRDS ARE FAKE" that overlaps the user interface of the mobile app 202. As such, the native mobile app 202 cannot detect a changed viewport when a private session is active at runtime. In one example, the user can select where a banner is presented (e.g., top, bottom) and how long the banner is presented (e.g., during an entirety of the private session or only for the first 30 seconds). As such, the user that set the visual indication can detect a faked private session when the custom banner 204 is presented with different text or at a different location or for a different time. The illustrated features also include a shaded foreground 206 that overlays a text area, and the addition of an icon 208 presenting dark sunglasses. As such, a private mode can change an appearance of the mobile app 202 by overlaying a translucent color, shading, or text in the foreground of the native user interface, therefore indicating to the user that a private session is active at runtime, without allowing the native mobile app 202 to detect the overlay. The private mode for the mobile app 202 can thus be verified when the combination of four features is presented as specified by the user. In contrast, the user can detect when the mobile app 202 is not in a private session or is attempting to circumvent the private session when the combination of four indications is not presented as specified by the user.

Figure 3:
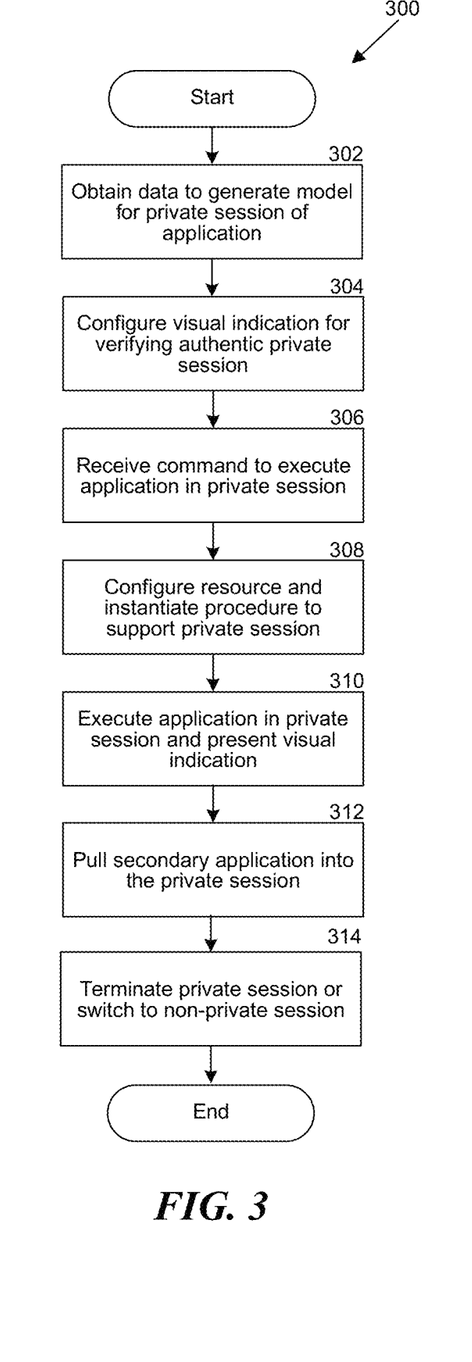
FIG. 3 is a flowchart that illustrates a process for executing a mobile app in a private session.

FIG. 3 is a flowchart that illustrates a process for executing a mobile app in a private mode. The process 300 includes portions that can be performed by an endpoint device. The endpoint device can include a hardware processor and a non-transitory memory storing instructions, which, when executed by the at least one hardware processor, cause the endpoint device to perform the process 300. In one example, the endpoint device is a mobile device such as a smartphone, tablet computer, or any other device that can download apps from a remote server. Moreover, the process 300 can be performed by a non-mobile device (e.g., desktop computer) that likewise can download apps from a remote server.

At 302, the endpoint device can generate a model for the target app. In one example, the target app is a native application for a mobile platform of the endpoint device. The private mode is a native function of the endpoint device configured to host the target app in a private session. The model is trained based on, for example, metadata or data of mobile apps that have a characteristic in common with the target app. For example, the endpoint device can retrieve metadata about the target app from an app store from which the target app was downloaded to the endpoint device. Examples of the metadata include a source or creator of the target app, a date on which the target app was made publicly available on the app store, a version of the target app, a popularity rank of the target app relative to other apps, or a category of the target app designated by the app store from among multiple categories. In another example, the endpoint device can determine a characteristic of the target app based on an analysis of the target app and related data including a utilization metric of the target app or a type of data handled by the target app. The endpoint device can then generate the model for the target app based on the metadata and/or the characteristics data.

At 304, the endpoint device can receive input that customizes a visual indication configured to indicate that the target app is in the private mode. The visual indication is a native function of the endpoint device and, as such, control of the visual indication is independent of the target app and the visual indication is transparent and undetectable to the target app executing in the private session. Hence, when the target app is hosted in the private session, the endpoint device presents an interface including the visual indication. In contrast, when the target app is in the non-private session, the endpoint device presents the interface without the visual indication.

More specifically, before launching the target app, the user can select one or more features that define the visual indication. The one or more features can include a graphical object added to the interface or a change to content of the interface presented only while the target app is a private mode. The endpoint device then associates the visual indication with the target app to present the user interface including the visual indication while the target app is hosted in the private session and display the interface without the visual indication while the target app is hosted in a non-private session.

For example, the endpoint device can receive a command to execute a target app on the endpoint device in a private mode. The target app is configured to present an interface on a display of the endpoint device. As such, the endpoint device instantiates a procedure that utilizes a local resource of the endpoint device to isolate data of the target app and executes the target app in the private session, where the interface includes display of the visual indication. The visual indication is predefined by a user of the endpoint device to enable verification by the user of the authenticity of the private session. Further, switching the target app to run on the endpoint device in a non-private session causes the endpoint device to terminate the procedure that utilizes a resource of the endpoint device to isolate data of the target app, and removes the visual indication of the user interface of the target app. Likewise, switching the target app to run in the non-private session will change the interface to display the visual indication. The user can also later change the visual indication to define a new visual indication for the target app. When the user does so, the new visual indication is associated with the target app to present the interface including the new visual indication while the target app is executing in the private session.

At 306, the endpoint device receives an input to execute a target app in a private session on the endpoint device. For example, the endpoint device can present an icon of the target app on the touch-sensitive display of the endpoint device. The icon can include an option to host the target app in a private session or a non-private session. The user selects to launch the target app in the private session.

At 308, in response to the input, the endpoint device can configure a local resource of the endpoint device to host the target app in the private session. The endpoint device can also instantiate a procedure that utilizes the local resource to, for example, isolate the data of the target app while being hosted in the private session. In one example, the local resource and the procedure are configured based on the model for the target app as described at 304. In another example, the local resource includes a memory, and the procedure that utilizes the memory causes the endpoint device to create a private memory space when the private session is established. The endpoint device stores the data of the target app in the private space while the target app is being hosted in the private session. In another example, the local resource includes a hardware processor. The procedure that utilizes the hardware processor causes the endpoint device to tag the data of the target app while in the private session and store the tagged data at a memory of the endpoint device. The data stored or tagged during the private session can be readily deleted when the target app is terminated or switched to being hosted in a non-private mode.

At 310, the endpoint device executes the target app in the private session on the endpoint device. The operation of the private session and the non-private session are transparent to the target app. That is, the target app cannot necessarily detect whether it is being hosted in a private session or a non-private session despite features of the endpoint device being altered. For example, a local resource configured for the private session can include hardware components such as connectivity components, image capture components, sensors or software components such as accessibility features. The procedure that utilizes the local resource can block access to the hardware or software components from the target app while being hosted in a private session. For example, the endpoint device can block screenshots or deny accessibility features (e.g., key logging) without the target app detecting that it is being hosted in the private session.

At 312, the endpoint device can detect a secondary app associated with the target app. The secondary app is also a native app of the mobile platform or can be a hybrid app or web app. For example, a social media app can open a secondary image management app to post images onto a user's social media site. The endpoint device can pull the secondary app in the private session with the target app. As such, the private session is configured to isolate data of the target app and the secondary app.

At 314, the endpoint device can receive an input to terminate the target app executing on the endpoint device. In response, the endpoint device can remove the data of the target app from a memory of the endpoint device. For example, the endpoint device can terminate the private memory space for the target app when the private session terminates. In another example, terminating the private session causes the endpoint device to automatically remove tagged data that is stored in the memory of the endpoint device, where the tagged data is associated with the target app while hosted in the private session.

In another example, the endpoint device receives an input to switch the target app from executing in the private session to executing in the non-private session. In response, the endpoint device can reconfigure the local resource to support the target app in the non-private session. For example, the endpoint device terminates the procedure that utilizes the local resource to isolate the data of the target app while in the private session.

Figure 4:
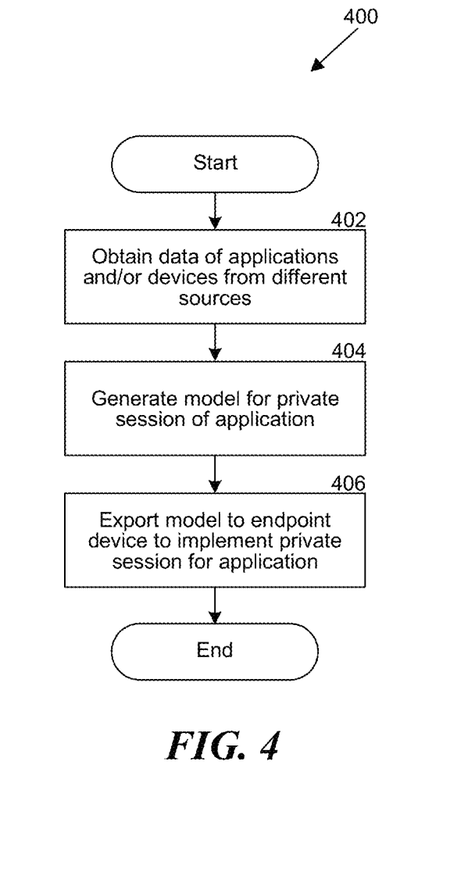
FIG. 4 is a flowchart that illustrates a process to build a model used to configure a mobile device to execute a mobile app in a private session.

FIG. 4 is a flowchart that illustrates a process to build a model used to configure an endpoint device for executing a target app in a private session. The process 400 includes portions that can be performed by a server that is remote to the endpoint device as an alternative or in combination to building a model at the endpoint device as described with respect to FIG. 3. The server can include a hardware processor and a non-transitory memory storing instructions, which, when executed by the at least one hardware processor, cause the server to perform the process 300. In one example, the server is an OEM server of a endpoint device on which the target app will execute in a private or non-private session.

At 402, the server can obtain data about one or more native apps stored on an app store. The data can include metadata of the one or more native apps and/or data indicative of characteristics of the native apps. The model can also be built on data that is retrieved from the endpoint device or other devices. For example, the server can build the model based on data about the performance of the target app on the endpoint device and other native apps that are stored in the endpoint device.

At 404, the server can generate a model for a target app based on the data obtained about the one or more native apps. The model is independent of the target app and includes a setting that configures an endpoint device to support the target app in a private session. Further, the private session is a native function of the endpoint device and is configured to isolate data of the target app. In one example, the model is generated based on data of a group of native apps similar to the target app. The similarity between the group of native apps and the target app is based on, for example, a common application category as indicated in the app store, a common application type having different versions, and/or a common source or creator.

At 406, the server can export the model to the endpoint device to execute the native application on the endpoint device in a private session, where the private session is transparent to the target app. The server can continue training and exporting updated versions of the model based on new data retrieved from endpoint devices or application servers to continuously improve performance of the private session for the target app.

Computer System

Figure 5:
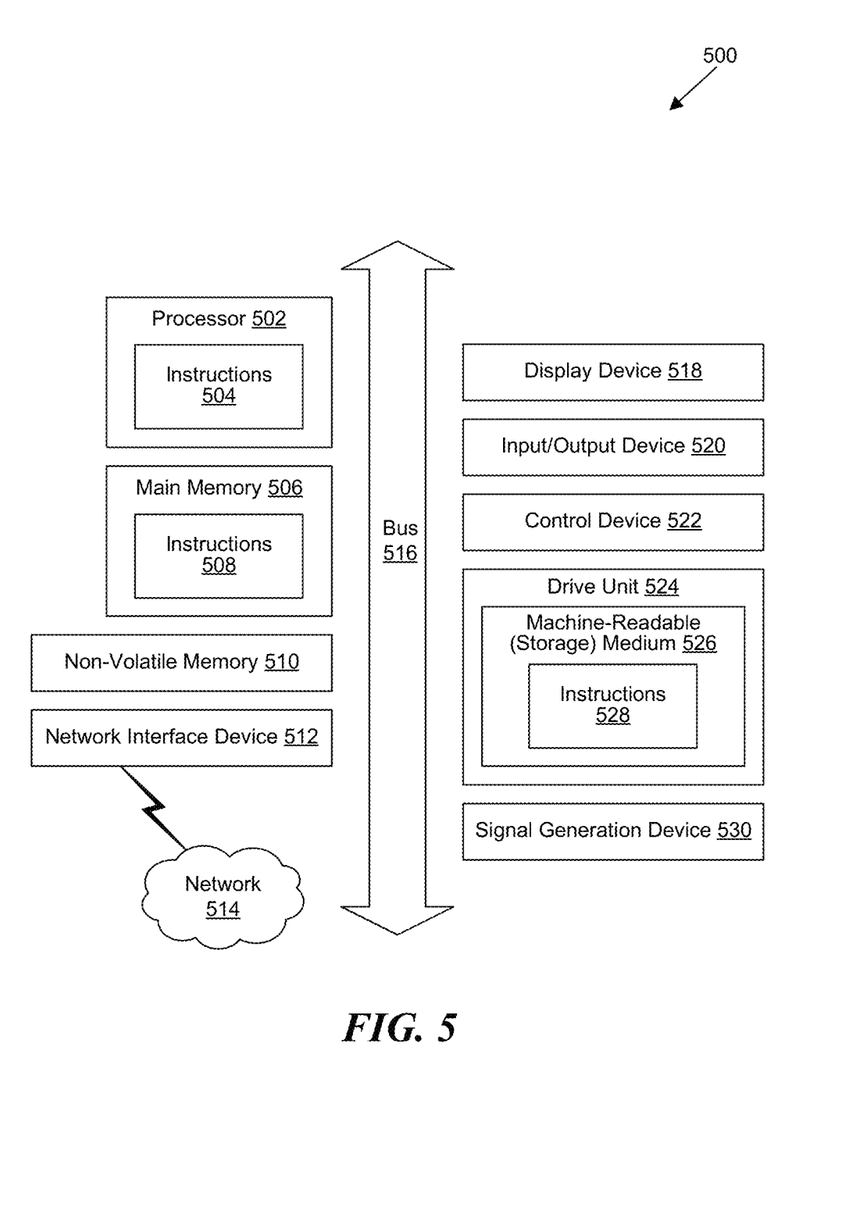
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways.

Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system comprising:
one or more processors; and
memory coupled to the one or more processors, wherein the memory includes instructions executable by the one or more processors to:
  present a query to a user requesting a user input selecting one or more features including at least two of: a font, a location, a color, or a transparency,
    wherein the one or more features define a visual indication that indicates whether an application running on a user device is executing in a private mode, and
    wherein the private mode is configured to prevent data associated with the application from persisting on the user device;
  receive the user input selecting the one or more features, including at least two of a selected font, a selected location, a selected color, or a selected translucency, that define the visual indication,
    wherein the one or more features include a graphical object added to a user interface associated with the application or a change to content of the user interface presented only while an application is executing in the private mode;
  obtain from the application an image to display to the user;
  determine whether the application is running in the private mode;
  upon determining that the application is running in the private mode, present the image to display to the user and the visual indication, with the at least two of the selected font, the selected location, the selected color, or the selected translucency, on the user device,
    wherein a deviation from the at least two of the selected font, the selected location, the selected color, or the selected translucency indicates that the application is not running in the private mode; and
  upon determining that the application is not running in the private mode, present the image to display to the user on the user device.

2. The system of claim 1, wherein the visual indication includes a text, or an image.

3. The system of claim 1, wherein the application includes a neural network.

4. The system of claim 1, comprising instructions to:
obtain an indication to run the application in the private mode;
create a private space in the memory associated with the user device when the private mode is established;
store the data of the application in the private space while the application is hosted in the private mode; and
terminate the private space when the private mode terminates.

5. A system comprising:
one or more processors; and
memory coupled to the one or more processors, wherein the memory includes instructions executable by the one or more processors to:
  present a query to a user requesting a user input selecting one or more features that define a visual indication showing whether an application running on a user device is executing in a private mode,
    wherein the private mode is configured to prevent data associated with the application from persisting on the user device;
  receive the user input selecting the one or more features that define the visual indication,
    wherein the one or more features include a graphical object added to a user interface associated with the application or a change to content of the user interface presented only while an application is executing in the private mode;
  obtain from the application an image to display to the user;
  determine whether the application is running in the private mode;
  upon determining that the application is running in the private mode,
    present the image to display to the user and the visual indication on the user device;
    overlay the visual indication on the image to display to the user, thereby preventing the application from detecting the visual indication; and
    present the visual indication overlaid on the image to the user; and upon determining that the application is not running in the private mode, present the image to display to the user on the user device.

6. A system comprising:

one or more processors; and memory coupled to the one or more processors, wherein the memory includes instructions executable by the one or more processors to:

present a query to a user requesting a user input selecting one or more features that define a visual indication that indicates whether an application running on a user device is executing in a private mode, wherein the one or more features includes a duration associated with the visual indication, and wherein the private mode is configured to prevent data associated with the application from persisting on the user device;

receive the user input selecting the one or more features, including a selected duration, that define the visual indication, wherein the one or more features include a graphical object added to a user interface associated with the application or a change to content of the user interface presented only while an application is executing in the private mode;

obtain from the application an image to display to the user;

determine whether the application is running in the private mode;

upon determining that the application is running in the private mode, present the visual indication lasting for the selected duration, wherein a deviation from the selected duration indicates that the application is not executing in the private mode; and upon determining that the application is not running in the private mode, present the image to display to the user on the user device.

7. A method comprising:

presenting a query to a user requesting a user input selecting one or more features that define a visual indication showing whether an application executing on a user device is executing in a private mode, wherein the private mode is configured to prevent data associated with the application from persisting on the user device;

receiving the user input selecting the one or more features that define the visual indication, wherein the one or more features include a graphical object added to a user interface associated with the application or a change to content of the user interface presented only while the application is executing in the private mode;

obtaining from the application an image to display to the user; and associating the visual indication with the application, wherein when the application is executing in the private mode, the user interface including the visual indication is presented such that the visual indication overlays the image, thereby preventing the application from detecting the visual indication, and wherein when the application is executing in a non-private mode, the user interface without the visual indication is presented.

8. The method of claim 7, comprising:

presenting the query requesting the one or more features including at least two of: a font, a location, a color, a translucency, or a duration associated with the visual indication;

determining whether the application is executing in the private mode; and upon determining that the application is executing in the private mode, presenting at least two of: selected font, selected location, selected color, or selected translucency, wherein a deviation from at least two of: the selected font, the selected location, the selected color, or the selected translucency indicates that the application is not executing in the private mode.

9. The method of claim 7, wherein the visual indication includes a text or an image.

10. The method of claim 7, comprising:

presenting the query requesting a duration associated with the visual indication;

receiving the user input selecting the one or more features indicating a selected duration;

determining whether the application is executing in the private mode; and upon determining that the application is executing in the private mode, presenting the visual indication lasting for the selected duration, wherein a deviation from the selected duration indicates that the application is not executing in the private mode.

11. The method of claim 7, comprising:

obtaining an indication to run the application in the private mode;

creating a private space in a memory associated with the user device when the private mode is established;

storing the data of the application in the private space while the application is hosted in the private mode; and terminating the private space when the private mode terminates.

12. A computer-readable storage medium, excluding transitory signals and carrying instructions, which, when executed by at least one data processor of a system, cause the system to:

present a query to a user requesting a user input selecting one or more features that define a visual indication showing whether an application executing on a user device is executing in a private mode, wherein the one or more features includes a duration associated with the visual indication, and wherein the private mode is configured to prevent data associated with the application from persisting on the user device;

receive the user input selecting the one or more features, including a selected duration, that define the visual indication, wherein the one or more features include a graphical object added to a user interface associated with the application or a change to content of the user interface presented only while the application is executing in the private mode;

determine whether the application is executing in the private mode; and associate the visual indication with the application,
wherein when the application is executing in the private mode, the user interface including the visual indication is presented such that the visual indication lasts for the selected duration,
wherein a deviation from the selected duration indicates that the application is not executing in the private mode, and
wherein when the application is executing in a non-private mode, the user interface without the visual indication is presented.

13. The computer-readable storage medium of claim 12, comprising instructions to:
present the query requesting the one or more features including at least two of: a font, a location, a color, a translucency, or a duration associated with the visual indication; and
upon determining that the application is executing in the private mode, present at least two of: selected font, selected location, selected color, or selected translucency,
wherein a deviation from at least two of: the selected font, the selected location, the selected color, or the selected translucency indicates that the application is not executing in the private mode.

14. The computer-readable storage medium of claim 12, comprising instructions to:
obtain from the application an image to display to the user;
overlay the visual indication on the image to display to the user, thereby preventing the application from detecting the visual indication when the application is executing in the private mode; and
present the visual indication overlaid on the image to the user.

15. The computer-readable storage medium of claim 12, wherein the visual indication includes a text, or an image.

16. The computer-readable storage medium of claim 12, wherein the application includes a neural network.

17. The computer-readable storage medium of claim 12, comprising instructions to:
obtain an indication to run the application in the private mode;
create a private space in a memory associated with the user device when the private mode is established;
store the data of the application in the private space while the application is hosted in the private mode; and
terminate the private space when the private mode terminates.

* * * * *